United States Patent [19]

Grubb et al.

[11] 3,844,754
[45] *Oct. 29, 1974

[54] PROCESS OF ION EXCHANGE OF GLASS

[75] Inventors: Everett F. Grubb, Toledo, Ohio;
Augustus W. La Due, Avon, Conn.

[73] Assignee: Owens-Illinois, Inc., Toledo, Ohio

[ * ] Notice: The portion of the term of this patent subsequent to Mar. 3, 1987, has been disclaimed.

[22] Filed: Feb. 4, 1970

[21] Appl. No.: 8,707

Related U.S. Application Data

[63] Continuation of Ser. No. 529,215, Feb. 23, 1966, Pat. No. 3,498,773.

[52] U.S. Cl............................ 65/30, 65/60, 65/116, 117/124 B
[51] Int. Cl....................... C03c 21/00, C03c 17/00
[58] Field of Search ................ 65/30, 60, 114, 116; 117/124

[56] References Cited
UNITED STATES PATENTS

| | | | |
|---|---|---|---|
| 2,701,215 | 2/1955 | Kroeck | 65/30 X |
| 2,779,136 | 1/1957 | Hood et al. | 65/30 |
| 3,473,906 | 10/1969 | Graham | 65/30 |
| 3,481,726 | 12/1969 | Fischer et al. | 65/30 |
| 3,498,773 | 3/1970 | Grubb et al. | 65/30 |
| 3,529,946 | 9/1970 | Fischer et al. | 65/30 |

FOREIGN PATENTS OR APPLICATIONS

| | | | |
|---|---|---|---|
| 140,966 | 0/1961 | U.S.S.R. | 65/30 |
| 966,734 | 0/1964 | Great Britain | 65/30 |

OTHER PUBLICATIONS

Kistler, S. S., "Stresses in Glass Produced by Nonuniform Exchange of Monovalent Ions," J. of Amer. Cer. Soc., February, 1962, vol. 45, No. 2, pp. 59–68.

*Primary Examiner*—S. Leon Bashore
*Assistant Examiner*—Kenneth M. Schor
*Attorney, Agent, or Firm*—Richard D. Heberling; E. J. Holler

[57] ABSTRACT

Glass articles can be strengthened by applying thereto a salt of an alkali metal, different from the alkali metal in the glass, and carrying out an ion exchange at a temperature below the strain point of the glass. The salt, which must contain an alkali metal carbonate, is deposited on the glass article as a mixture with water, or an organic solvent or both. The ion exchange is carried out for a period of time to form a compressive stress surface layer on the glass article, but for a time insufficient to provide ion exchange to a substantial degree in the interior portion of the glass and for a time insufficient to cause substantial stress relaxation of the glass in the surface layer.

5 Claims, No Drawings

PROCESS OF ION EXCHANGE OF GLASS

This application is a continuation of copending application Ser. No. 529,215, filed Feb. 23, 1966 now U.S. Pat. No. 3,498,773, issued Mar. 3, 1970, the entire disclosure of which is relied on and expressly incorporated herein by reference.

This invention relates to a process for treating articles of glass, including glass components of articles, to improve the strength of the glass articles and also relates to the articles resulting from the treatment by the process. The present invention especially relates to a process for treating silicate glass composed of silica and alkali metal oxide or oxides, with or without one or more of other compatible constituents such as alkaline earth metal oxides, alumina, zirconia, titania, boron oxide, glass coloring oxides such as oxides of iron, cobalt, nickel, manganese, chromium and vanadium, and fining agents and also especially relates to the silicate glass article resulting from the treatment by the present process.

As used herein, the term "glass" means those inorganic glasses that (1) are not controllably crystallizable, and thus can be devitrified as the term is normally used, to form crystalline material usually in a matrix of a glass having a composition determined by the initial composition and by the composition of the crystalline material; (2) are controllably crystallized by a heat treatment; or (3) have been controllably crystallized by a heat treatment. Glass that is controllably crystallizable is commonly referred to as thermally crystallizable glass composition. A crystallized glass is commonly referred to as a glass-ceramic.

As described in detail in the above-identified parent application many types of silicate glasses, including glass-ceramics, that contain alkali metal ions have been treated at an elevated temperature by contact with an alkali metal inorganic salt for exchange of alakali ions in a surface portion of the glass with alkali metal ions of the inorganic salt. The usual process is an immersion of the glass in a molten bath of alkali metal inorganic salt or of a mixture of the alkali metal inorganic salt with other inorganic salts. The time of immersion is sufficient to cause this exchange only in a surface layer of the glass article. Lithium ions in a glass have been exchanged alternatively with sodium and potassium ions in molten inorganic salt baths. Sodium ions in glass have been exchanged with lithium and potassium of molten salt baths containing lithium and potassium inorganic salts.

When a larger alkali metal ion replaces a smaller alkali metal ion in the surface layer of glass at a temperature that is below the strain point of the glass, the surface layer then has a compressional or compressive stress. Apparently the larger ions try to occupy the smaller spaces previously occupied by the smaller alkali metal ions, thereby creating the compressional stress in the surface layer. Because the temperature of the glass is below the strain point, the glass structure cannot readjust itself to relieve the stress.

When a smaller alkali metal ion replaces a larger alkali metal ion in the surface layer of the glass the expansion coefficient of the surface layer will be changed to a lower value than that of the interior part of the glass article and with the result that the surface layer has a compressional stress. This ion exchange can be carried out at a temperature either below the strain point or at a temperature above the strain point but below the softening point of the glass. When the process of ion exchange is carried out below the strain point to replace a larger alkali metal ion in the glass with a smaller alkali metal ion, then the article after the actual exchange is then heated to a temperature sufficiently above the strain point to heal strength-reducing minute cracks occurring during the ion exchange treatment, due to the difference in the expansion coefficients of the interior and the surface layer. Then the stress and the resultant improved strength in the final product will be due to the compositional difference. When there is obtained by the ion exchange a surface layer that has a substantially lower coefficient of expansion than that of the interior glass, the ion exchange is performed as near to, but still below, the strain point as feasible, to avoid the creation of substantial cracks that would not be healed by the latter heating to a temperature above the strain point.

Various alkali metal salts have been used in molten form to ion exchange with alkali metal ions of a glass. However, some molten alkali metal salts, such as potassium nitrate, are dangerous when used with the salt temperature above 750°F., because they can decompose spontaneously. Also metal nitrate salts, such as potassium nitrate, at such high temperature react very vigorously with organic material. In the manufacture of some glass articles, such as glass containers, molds are used. These molds are periodically lubricated by sprays of hydrocarbon material. Unless such material is removed from the glass surface prior to contact with molten potassium nitrate for ion exchange treatment, vigorous reaction can occur. It is not feasible to remove such organic material from the outer surface of a glass container right after it is taken from the mold, because the temperature of the container is a very high temperature. Also the container must be subjected to an annealing treatment before being cooled to room temperature or to a moderate temperature at which the organic material can be removed by washing.

It is an object of the present invention to provide a process of treating a glass article that uses an alkali metal salt as an ion exchange medium but does not require that the alkali metal salt, alone or admixed with other salts, be in molten form to replace another alkali metal ion in the surface layer of the glass.

It is a further object of this invention to provide a process of treating glass that uses an ion exchange medium that is liquid for easy application at room temperature or at a moderately elevated temperature but is changed in composition due to the vaporization of one or more liquid components to provide a solid film on the glass surface at the elevated temperature used for ion exchanging an alkali metal ion of the medium with another alkali metal ion in the surface layer of the glass.

It is another object of the present invention to provide a glass article obtained by the process of this invention.

Other objects and advantages of the invention will be apparent from the description of the invention that follows.

The process of the present invention can be stated broadly as comprising (1) forming on at least an area of a surface of an article of glass, containing at least about 2 percent, preferably at least about 5 percent, by weight an alkali metal to be at least partially replaced, expressed as soda ($Na_2O$) mole equivalent, a substantially continuous layer of material consisting essentially of salt of a different alkali metal, (2) maintaining said surface area and said layer of material at an elevated temperature below the strain point of the glass and for a period of time only for some of said alkali metal of the glass in the surface layer of the glass to exchange with said different alkali metal to provide a compressive stress in said surface layer of the glass in said area, and (3) cooling the glass article to a temperature at which said exchange does not occur, said layer of material and said alkali metal salt therein being solid at said elevated temperature. The alkali metal salt or mixture of these salts constitutes at least 90 percent by weight of said layer of material formed on the glass. Preferably the alkali metal salt is a salt, such as carbonate, that is alkaline in water and that is used alone or with other alkali metal salt and in such case can constitute substantially less than 90 percent by weight of layer of material when the molar ratio of alkali metal carbonate to other salt of that alkali metal is at least about 1:5. The layer of material can be removed prior to or after the completion of the cooling step.

The elevated temperature at which the layer of material, containing alkali metal salt, and the glass article on which it is formed are maintained at an elevated temperature, as mentioned above, which is usually a temperature of at least about 200°C.

The layer and the alkali metal salt are such that neither melts nor decomposes at or below the elevated temperature used and neither the layer nor the salt melts nor decomposes at a temperature of 425°C. (about 800°F.). The alkali metal of the salt is preferably of an alkali metal that is immediately adjacent to said alkali metal in glass in the arrangement of alkali metals as Group I of the Periodic Table of the Elements.

When the alkali metal in the glass has a smaller atomic radius than the different alkali metal in the salt, the elevated temperature can be below the strain point of the glass.

The period of time at which the layer and the area of the glass article are maintained at the elevated temperature is dependent on various factors, such as (1) the glass composition, including the particular alkali metal in the surface layer, (2) the salt of the different alkali metal, including the nature of the anion of the salt, whether the alkali metals of the glass and the salt are immediately adjacent (as defined above) and whether the alkali metal of the glass has the smaller or larger ionic radius, (3) the elevated temperature used, (4) the depth desired for the compressive stress to be obtained by the process, and (5) whether the salt or mixtures of salts at the highest portion of the range of elevated temperature etches the glass surfaces and such etch is desired or is to be avoided or minimized.

When the temperature is below the strain point of the glass being treated, the time is between about ½ hour to about 24 hours, with the time varying inversely with temperature.

In the process of this invention the layer of material consisting essentially of the salt of the different alkali metal can be formed on the area of the glass article by any of numerous techniques. For example, this layer can be formed by spraying this surface area of the glass article with a fluid, as a liquid stream or a spray of liquid droplets in a gas stream, that is a mixture containing the alkali metal salt and a liquid, such as water, an organic material and compatible mixtures thereof. The organic material is liquid at the temperature at which the mixture is sprayed onto the glass surface.

The organic material, when used in place of or with water, is an organic compound or mixture of organic compounds that will impart adherence of the alkali metal salt to the glass surface and yet will volatilize, with or without decomposition, or burn off at a temperature below or at the temperature maintained for the ion exchange step of the process without adversely affecting the adherence of the alkali metal salt to the surface of the glass article so that the alkali metal salt will form a substantially continuous layer of solid material on the sprayed area of the glass surface. Of course, more than one alkali metal salt may be used, provided the mixture of these salts does not have a melting point at or below the elevated temperature at which the layer and the glass article are maintained for the ion exchange.

Water is the preferred liquid that is used admixed with the alkali metal salt to form via the spray technique a substantially continuous layer of material containing alkali metal salt. If the glass is at the elevated temperature used for the ion exchange step, the water of the spray will volatilize from the glass surface and leave the solid material, consisting essentially of alkali metal salt, as a solid layer on the glass surface. Also, if the liquid spray is used on the glass article at a temperature below that elevated temperature, the water content of the spray will be removed by volatilization as the article and the spray coating thereon are raised to the elevated temperature. It is preferred that the fluid mixture be applied to the glass article which is at a temperature above the boiling point of water to permit by one spray application the formation of the solid layer with a sufficient depth to provide enough alkali metal salt for the desired degree of ion exchange. Thus the temperature of the surface of the glass to which the spray, containing water and alkali metal salt, is applied is preferably above about 300°F. (above about 150°C.), and for certain utilizations of the process it is preferred that the temperature be at least above about 600°F. to 900°F. (above about 315°C. to 485°C.).

The mixture of liquid, either water and/or organic material, and alkali metal salt contains a sufficient concentration of the latter to provide a minimum amount of spraying to form a layer of solid material that will provide the ion exchange to the desired degree. This mixture, that is sprayed, is preferably a solution of the salt in the liquid, either water and/or liquid organic material. Slurries of alkali metal salt and liquid, either water and/or liquid organic material may be used as the spray material. The preferred solutions are aqueous solutions that are saturated with the salt or the salts at a temperature at which the aqueous solution is used in the spray directed to the glass article.

Another way of forming this layer containing alkali metal salt in the surface area of the glass article is by dipping or immersing this surface portion of the glass article in the fluid mixture followed by removal of the glass article before its maintenance at the elevated temperature for ion exchange. In this case, fluid mixture adheres to the surface area by dipping or immersion and before or at the elevated temperature water or volatile organic material leaves to leave an adherent layer of solid material consisting essentially of one or more of salts of said different alkali metal with or without (preferably without) one or more salts of another alkali metal and/or other metals. In any event, the solid layer must be of such composition that it remain solid at the elevated temperature utilized for the ion exchange step of the process.

For the dipping or immersion technique as part of the formation of the solid layer on the glass, aqueous solutions of the alkali metal salt or salts are preferred. Especially preferred are saturated aqueous solutions, as mentioned above for the spray technique.

Organic materials used to provide an adherent layer of alkali metal salt that is substantially continuous on the surface area may be chosen from a wide variety of organic compounds, individually or as mixtures. The preferred organic material is a mixture of nitrocellulose and amyl acetate, that is used to provide a suspension or slurry of the alkali metal salt. This suspension or slurry, when it is sprayed on a surface area of a hot glass article, will burn clean and there will be formed a solid, adherent film or layer of alkali metal salt. The organic material used is required, of course, to be a material that does not react with the alkali metal salt.

Other techniques of applying the layer of solid material is by applying the mixture of salt and liquid by a brush or squeegee or through a screen or by placing a porous sheet containing the mixture in its pores against the glass surface.

As described later, there are many types of glasses that contain alkali metal oxide that can have alkali metal ions in the surface layer replaced by other alkali metal ions of salt in the layer formed on the glass. Some of these alkali metal salts, that are suitable for use in the present process, have been used at an elevated temperature, but only when admixed with other alkali metal salts in which the mixture is liquid at the elevated temperature used heretofore for the ion exchange.

Potassium nitrate has been used in the prior art to replace sodium in a glass with potassium at a temperature at which the potassium nitrate is liquid. Mixtures of potassium nitrate with other potassium salts, such as potassium chloride and potassium sulfate, have been used to provide the liquid ion-exchange bath medium. In such mixtures the potassium nitrate constitutes the predominant mole percentage.

In the process of the present invention some alkali metal salts, used heretofore, such as potassium sulfate and potassium chloride, admixed with nitrate salts of the same alkali metal or another alkali metal to provide a liquid ion-exchange bath, are used alone. They have melting points above the elevated temperature at which the ion-exchange step is conducted. They are used in the present invention with salts of alkali metal that have not been used heretofore, such as carbonate salts of alkali metal, that have melting points above this elevated temperature, provided that the mixture as a layer is solid at the elevated temperature of the present process. For example, in the replacement of at least part of sodium ions in the surface layer of glass with potassium ions by using potassium salt or salts, the present invention utilizes such potassium salts as potassium carbonate (m.p. of 891°C.), potassium chloride (m.p. of 790°C.), potassium sulfate (m.p. of 1,069°C.), potassium bromide (m.p. of 730°C.), potassium tribasic phosphate (m.p. of 1,340°C.) and potassium metaphosphate (m.p. of 807°C.). They are salts of potassium that have melting points above the annealing point of most of the glasses that are ion exchanged by the present process and some of these salts have melting points above the annealing point of all the glasses treated by the process of the present invention that have an annealing point and above 1,400°F. for those glasses that are glass-ceramics. Examples of lithium salts that have suitable melting points are lithium carbonate (m.p. of 618°C.), lithium chloride (m.p. of 614°C.), lithium bromide (m.p. of 547°C.), lithium sulfate (m.p. of 860°C.), and lithium tribasic phosphate (m.p. of 837°C.). When using sodium salt to replace, e.g., lithium or potassium in glass by the present process, suitable salts are sodium carbonate (m.p. of 851°C.), sodium chloride (m.p. of 800°C.), sodium bromide (m.p. of 755°C.), sodium iodide (m.p. of 651°C.), sodium sulfate (m.p. of 884°C.), sodium pyrophospate (m.p. of 988°C.) and sodium metaphosphate (m.p. of 628°C.). The comparable salts of rubidium and cesium can be used, with their suitable high melting points, to replace other alkali metals or each other.

The terms "annealing point" and "annealing temperature" as used herein mean the same thing. The annealing point is the temperature at which the internal strains in glass are reduced to an acceptable limit in 15 minutes and that the glass temperature has a viscosity of $10^{13}$ poises. It is determined by a test (ASTM Design. C336–54T) which is made with a weighted glass fiber in a furnace cooled at a rate of 4°C. per minute. The annealing-point temperature is determined from rates of elongation of the fiber. The strain point is the temperature at which the internal stresses are reduced to low values in 4 hours. At this viscosity, which is $10^{14.5}$ poises, the glass is substantially rigid. The data for determining the strain point are obtained by using the same procedure that is used for the annealing point, but for a slower rate of fiber elongation.

The flexural strength of modulus of rupture of glass can be determined by a number of testing methods. A common method uses the Tinius-Olsen testing machine as described in the parent application.

The flexural strength of rods, with or without ion-exchange treatment, can be determined by this method and compared with the flexural strength of such rods after subjecting them to a substantial degree of abrasion. Several methods of abrasion have been developed. One example of abrasion comprises tumbling the rods for 15 minutes in a ball mill containing No. 30 silicon carbide grit. This type of abrasion can substantially reduce or eliminate the increase of flexural strength afforded by ion-exchange. It is believed that this type of abrasion is much too severe for the evaluation of ion-exchange strengthening of glass that is to be utilized in the form of certain products, such as glass containers, that will not be subjected in service to this severity of abrasion. With such severe abrasion it is necessary that the depth of the compressive stress layer be at least about 50 microns. However for certain products, such as glass containers, a depth of compressive stress layer of at least about 10 microns is sufficient to retain a substantial degree of increase of strength, afforded by the ion-exchange treatment, during the use and reuse of such products for a reasonable period of time.

Glass bottles of containers can be tested for impact strength using the Preston impact testing machine, Model 400, which is marketed by American Glass Research, Inc., Butler, Pa.

To determine the loss of the strength of bottles as a result of service use, there has been developed a machine that simulates the type of abuse received by bottles when they are fed to and taken away from the filling station in a plant where the bottles are filled with products. This machine is known as the Consumer Line Simulator, also referred to as the CLS Abuser. Abuse for 1 minute using this device is supposed to be equivalent to the amount of abuse that glass containers receive in 1 year of service. Of course, this refers to returnable bottles which go through the product filling station a number of times within a year.

The following examples illustrate preferred embodiments of the present invention using various alkali metal salts and using various types of glass, illustrative of those that are ion exchangeable by the present process.

EXAMPLE I

One-way beer bottles, that were made of a conventional flint container glass and are referred to by assignee as GB-2000 bottles, were sprayed with aqueous salt solutions immediately after the formation of these bottles and thus prior to their annealing. The bottles at the place of spraying would be at temperatures between about 600°F. and about 900°F., as previously determined. The temperature of bottles at the spraying locations varied in temperature study because they were from different molds of an IS machine and were different styles of bottles.

Some bottles were sprayed on their outside surface with an aqueous solution of potassium carbonate. Some were sprayed on their outside surface with an aqueous solution containing two salts using 80 mole percent potassium carbonate and 20 mole percent potassium chloride. These solutions were prepared by heating water to boiling temperature and adding salt or mixture of salts to dissolve as much salt as possible. The aqueous solution was cooled to room temperature to provide saturated solutions in the presence of solid salt. The hot, newly-formed bottles after being sprayed with these saturated salt solutions, were immediately run through the annealing lehr to receive the normal annealing-temperature treatment that unsprayed bottles receive in their manufacture.

A temperature profile in a normal annealing lehr has been determined using a traveling thermocouple attached to the bottom of a bottle. This temperature profile determination indicates that for about the last one-half of the initial 5 minutes the temperature of the bottom of the bottle was rising from about 980°F. and then in the next 5 minutes the bottom of the bottle was at a temperature between 1,000°F. and 1,025°F. After the first 10 minutes the temperature decreases. At the end of about 15 minutes overall, the temperature was reduced to 900°F. and at the end of 20 minutes overall it was reduced to about 600°F. followed by still further cooling. The total travel time through the lehr is about 40 minutes. The temperature in the sidewall portion of the bottle passing through the lehr will be ahead of the temperature of the bottom during the heat-up period and will retain that temperature of the bottom during the cooling period.

The glass of these bottles has an annealing point of 1,033°F. and a strain point of 986°F. This glass has the following theoretical composition, expressed as oxides in weight percent:

| | |
|---|---|
| SiO$_2$ | 72.0 |
| Al$_2$O$_3$ | 1.9 |
| CaO | 9.6 |
| MgO | 4.2 |
| Na$_2$O | 11.5 |
| K$_2$O | 0.4 |

This is a conventional soda-lime-silica container glass. Its manufacture is described in many places in the literature.

The bottles after exiting from the annealing lehr and cooling to room temperature were washed with dilute nitric acid. An examination of the bottles indicated that they had on their outer surface a 15-micron depth of surface compressive stress layer.

Part of the bottles from each type of spray-and-heat treatment were subjected to 10 minutes of abuse with the CLS Abuser. These and the other ion-exchange bottles that were not subjected to abuse were tested for shoulder impact strength. Bottles of the same type, but that had been through the annealing lehr and had not been sprayed with aqueous salt solution, were tested also for shoulder impact strength. Some of these untreated bottles were abused by the CLS Abuser for 10 minutes prior to testing for impact strength. The degree of pendulum drop increases with increase in shoulder impact strength. The following tabulates the data for shoulder impact strength of the one-way beer bottles untreated and those sprayed with two different salt solutions and heat treated, all without abuse. The other values are the strengths on other bottles of these groups after the 10-minute abuse.

| | Untreated | K$_2$CO$_3$ | 4K$_2$CO$_3$/KCl |
|---|---|---|---|
| No abuse | 79° | 67° | 49° |
| Abused | 44° | 63° | 52° |

The foregoing data show clearly the increase of strength obtained by the alkali metal salt treatment at the elevated temperature and its substantial retention after a greater amount of abuse than the bottles would be expected to receive. The data also show the advantages of using potassium carbonate alone as compared with the specific mixture of its and potassium chloride as the alkali metal salt layer on the glass during the elevated temperature treatment.

EXAMPLE II

One-way beer bottles, having the glass composition described above in Example I, were broken into pieces that were melted in a pot. The molten glass was used to draw cane from which rods were prepared for treatment in accordance with this process. Of course, this glass has the strain point and annealing point mentioned in Example I. The rods were preheated to 700°F. in an oven. Immediately upon removal from the oven they were sprayed with one of two aqueous salt solutions. These were saturated solutions, prepared as described above in Example I, of potassium carbonate and potassium sulfate. The sprayed rods were then placed in an oven maintained at the desired temperature. For each temperature, some rods were maintained in the oven for a longer period of time than others. The heat-treated, coated rods then were cooled slowly to room temperature and washed for removal of the salt coating. The rods coated with potassium carbonate, were washed with the dilute nitric acid. Those coated with potassium sulfate were washed with water. The rods were examined for depth of compressive stress surface layer. All had a compressive stress in that layer. Samples from the rods and having a thickness of about 0.0008 inch were examined for compressive retardation expressed in millimicrons. The data are tabulated below for the different times and temperature treatment.

| Salt Used | Temp., °F. | Time, Minutes | Depth of Layer | Stress Retardation |
|---|---|---|---|---|
| $K_2CO_3$ | 1050 | 5 | 11 | 190 |
| | | 15 | 22 | 180 |
| | | 30 | 22 | 150 |
| $K_2CO_3$ | 1025 | 5 | 11 | 210 |
| | | 15 | 11 | 180 |
| | | 30 | 20 | 150 |
| $K_2CO_3$ | 1000 | 5 | 11 | 210 |
| | | 15 | 30 | 180 |
| | | 30 | 17 | 220 |
| $K_2CO_3$ | 975 | 5 | 11 | 200 |
| | | 15 | 11 | 200 |
| | | 30 | 18 | 200 |
| $K_2SO_4$ | 1025 | 5 | 4 | 50 |
| | | 15 | 6 | 50 |
| | | 30 | 8 | 50 |

The greater is the depth of the layer of compressive stress, the greater is the resistance to loss of increased strength by abuse. This depth of layer should be at least 10 microns, as mentioned above, and is preferably at least 15 microns. The greater is the compression retardation, the greater is the increase in strength. However, a bottle having a greater compression retardation as a result of the ion-exchange treatment than another bottle that has a greater depth of compressive stress layer is not necessarily better from the standpoint of commercial use. Retention of increased strength, during use, is assured by layer depth and not by amount of compression retardtion. The data for potassium sulfate treatment indicate that it is less effective as an ion exchange medium than potassium carbonate. At the temperature used potassium sulfate did not provide a sufficient depth of compressive stress surface layer to afford a retention of satisfactory increase in impact strength during a service-simulated abuse. However, the data for potassium sulfate treatment indicates that there can be a definite increase in strength of the glass article as a result of this potassium sulfate treatment in accordance with the present invention. This strength increase can be retained by coating the treated and washed bottles with an organic coating to impart lubricity and thus avoid or minimize damage during use, especially in a product filling line.

EXAMPLE III

One-way beer bottles (GB–2000 size and shape) were made but using a molten glass having the following composition expressed as oxides on a weight percent basis:

| | |
|---|---|
| $SiO_2$ | 72 |
| $Al_2O_3$ | 3 |
| MgO | 10 |
| $Na_2O$ | 15 |
| $K_2O$ | 0.5 |

This glass has an annealing point of 1,028°F. and a strain point of 980°F.

These bottles, directly from the bottle forming station of the IS machine, were sprayed on their outside surface with aqueous potassium carbonate solution, prepared as described in Example I, to provide a substantially uniform coating or layer of potassium carbonate upon evaporation of the water content. These bottles were also passed through the annealing lehr with the temperature profile indicated in Example I. At the exit end of the lehr the bottles were removed, cooled to room temperature and washed with dilute nitric acid for removal of the salt layer. Again the shoulder impact strengths for bottles were determined using the Preston standard impact machine, with and without prior abuse using the CLS Abuser. Other bottles of this glass composition, that were made at about the same time but were not sprayed, were passed through the annealing lehr and were also tested for shoulder impact strength. None of these bottles was subjected to abuse. The bottles, that were subjected to the potassium carbonate treatment at the lehr temperature, had compressive stress layers with a depth that varied from one bottle to another between 10 and 14 microns and they had an average compressive retardation value of 170 millimicrons. The average impact strength of the untreated bottles was 4.8 inch-pounds. The potassium carbonate treated bottles, without any abuse, had an average impact strength of 14 inch-pounds. The average impact strength for the bottles treated with potassium carbonate at the elevated temperature and subjected later to abuse was 16 inch-pounds. These are average values. The fact that the value after abuse is higher than the treated bottles without abuse is not indicative. However, it does indicate that the layer depth is sufficient to provide retention of increase of strength under the longer time of abuse than conventionally used to test bottles.

EXAMPLE IV

Rods of the flint container glass were made as described in Example II and each subjected to a spray of an aqueous salt solution. The rods had been preheated as in Example II. They were either placed in an oven as described for the bottles in Example II or were immediately placed in the annealing lehr described above in connection with Examples I and III for the temperature treatment as described in Example I. The salt content of the aqueous solutions was saturated, and these solutions were prepared as described in Example I. Five types of aqueous solutions were used and three of them contained only one potassium salt, whereas the other two contained a mixture of potassium chloride and potassium carbonate in a molar ratio of $K_2CO_3$:KCl of 1:1 and 1:4, respectively. The salt of the solution, the temperature maintained for the salt layer to react with the glass for ion exchange, the time for this maintenance in the case of the oven treatment and the modulus of rupture that was determined as described above using the Tinius-Olsen machine without any abrading treatment are tabulated below. The time for the treatment in the annealing lehr is not shown. The overall time was about 40 minutes, as described above, but the rods were at the various temperatures during their travel.

| Salt in Sol'n Sprayed | Temperature °F | Time in Minutes | Flexural Strength, p.s.i. |
|---|---|---|---|
| $K_2CO_3$ | 1025 | 30 | 33,000 |
| $K_2CO_3$ | 975 | 30 | 36,000 |
| $K_2CO_3$ | Anneal. lehr | | 40,000 |
| KCl | do. | | 17,000 |
| $K_2SO_4$ | do. | | 15,400 |
| $K_2CO_3$:KCl | do. | | 28,000 |
| $K_2CO_3$:4KCl | do. | | 20,000 |

Rods of this glass, but without the foregoing salt-and-heat treatment and without any abrading, had a flexural strength of 16,000 p.s.i. Other samples of the rods were not sprayed but were passed through the annealing lehr, and they were found to have a flexural strength of 13,500 p.s.i. Thus the foregoing data show the improved strengths obtained by treatment with some of the salts of the present invention applied as a uniform or substantially continuous layer of salt solid at the elevated temperature maintenance that is followed by cooling and coating removal.

EXAMPLE V

A glass was made in a large continuous furnace or tank lined with a high-alumina refractory (Monofrax M) to make a pressed glassware product. The glass had the following analyzed composition on a weight percent basis:

| | |
|---|---|
| $SiO_2$ | 70.4 |
| $Al_2O_3$ | 16.8 |
| MgO | 4 |
| $Li_2O$ | 3.5 |
| $ZrO_2$ | 1.3 |
| $TiO_2$ | 1.8 |
| $P_2O_5$ | 1.5 |
| F | 0.09 |
| $Na_2O$ | 0.5 |
| $As_2O_3$ | 0.15 |

The glass was made by melting at a temperature of 2,900°F. for about 43 hours a mixture of the following batch materials using a slight excess of air at an oxidizing atmosphere: petalite (contains 77.7% $SiO_2$, 16.2% $Al_2O_3$, 4.2% $Li_2O$, and minor amounts of other alkali metal oxides and other impurities); flint (99.9$^+$% $SiO_2$); Alcoa A—10 Alumina (99.5% $Al_2O_3$ and minor impurities); periclase (95.3% MgO, 0.5% $Fe_2O_3$, 2.8% $SiO_2$, 0.3% $Al_2O_3$, 1.1% CaO); Florida zircon (66% $ZrO_2$, 33.5% $SiO_2$, 0.25% $TiO_2$, 0.1% $Fe_2O_3$); titanox (substantially pure $TiO_2$); aluminum metaphosphate (substantially pure, except about 1 percent ignition loss); lithium fluoride (essentially pure LiF); arsenic trioxide, niter and water.

This glass had an annealing point of about 1,220°F. Cane was pulled from the glass melt and a number of glass rods about 3/16 inch in diameter were prepared from the cane. These rods at temperatures between 700° and 900°F. were sprayed with a saturated sodium chloride aqueous solution to produce a very fine, thin coating of sodium chloride on the rods. The coated rods were heated for 1 hour at 900°F. The rods were cooled slowly and then washed with water to remove the salt layer. An ion exchange occurred whereby lithium ions in the glass were replaced by sodium ions. The depth of the compressive stress surface layer was approximately 50 microns. These rods were found to have an average flexural strength of 45,000 p.s.i. whereas glass rods that were not subjected to the sodium chloride treatment at the elevated temperature had an average flexural strength of only 19,800 p.s.i. None of these rods was subjected to any abrasion treatment prior to testing for strength.

The glass of the composition of this example is thermally crystallizable. This glass has been ion exchanged using a molten bath of sodium nitrate maintained at 750°F. for ½ hour and for 3 hours.

The process of the present invention is not limited to the specific glass compositions that were used for the foregoing examples. The process is applicable to many other types of glasses that have been ion exchanged using alkali metal salts of inorganic acids in molten form and to other types of glass, especially silicate glass containing alkali metal ions capable of ion exchanging. Representative glasses as described in the above referred to patent application Ser. No. 529,215 are incorporated herein by reference.

Included among the representative glasses useful in the present invention are the alkali metal silicate glasses, the alkali metal silicates containing alkaline earth oxide or oxides in substantial amount, e.g., alkali-alkaline earth silicates, alkali aluminosilicates, and alkali borosilicates. Other silicate glasses useful in the present invention include alkali metal oxide-zirconia-silica glasses, alkali metal oxide-titania-silica glasses as well as lead-alkali silicate glasses. Some of the phosphate glasses contain alkali metal oxide, and such glasses may be treated by the process of the present invention to form articles of this invention.

It is seen from the foregoing that there are many types of silicate glasses that contain silica and alkali metal oxide. Some contain one or more other oxides that are real or probable glass formers and some contain other oxides as glass modifiers. These silicate glasses containing alkali metal oxide have compositions that contain the following components in the indicated percent ranges:

| | Percent by Weight |
|---|---|
| $SiO_2$ | 35–88 |
| $M_2O$ | 1–48 |
| $Al_2O_3$ | 0–40 |
| CaO | 0–15 |
| MgO | 0–28 |
| BaO | 0–15 |
| SrO | 0–15 |
| $B_2O_3$ | 0–15 |
| $ZrO_2$ | 0–25 |
| $TiO_2$ | 0–12 |
| $SnO_2$ | 0–2 |
| $P_2O_5$ | 0–10 |
| $As_2O_5$ | 0–3 |
| $Sb_2O_5$ | 0–3 | wherein $M_2O$ refers to the total of alkali metal oxide and, when the alkali metal oxide is lithium oxide, potassium oxide, rubidium oxide or cesium oxide, it constitutes a maximum of about 25 percent by weight of the glass composition. The content of alkali metal oxide to be at least partially replaced in a surface layer by another alkali metal oxide preferably constitutes at least 2 percent and for glasses, other than glass-ceramics, it is especially preferred that it constitutes at least 5 percent.

For those glass compositions that are thermally crystallizable to form glass-ceramics, antimony oxide or arsenic oxide is part of the batch material to form the glass. Up to about 1 percent by weight of either or total of both is used. They are used as fining agent or oxidizing agent. Most of these oxides are lost by vaporization in the glass-making furnace so that the final glass composition will actually contain at most only a few tenths of 1 percent. When arsenic oxide is used as fining agent there is commonly used also in the batch, a small amount of sodium nitrate, but it is not shown.

Fluorine as a salt is commonly used in batch material as an additive in an amount usually not exceeding 0.3 percent by weight in the final composition. Fluorine is believed to aid crystallization; but its content of the composition is limited to a low value, because it accelerates the crystallization, sometimes with an undesirable exothermic effect.

Within this glass composition, it will be apparent to one skilled in the art that there are narrower limits to the ranges of the individual oxides depending upon which ones are present to form a compatible mixture as a melt that when cooled will be a glass. These glasses are per se no part of the present invention. Instead, they are the materials that are treated by the process of this invention to form the improved glass articles. However, various classes of glasses within this broad type are referred to in Ser. No. 529,215 for purpose of illustrating the cited variation of glasses useful in the present invention.

When glass containers are made by the blow-and-blow forming technique from a gob of molten glass, the inside surface layer is substantially free of surface defects and may be considered a pristine surface. If such container is ion exchanged by immersion in a molten salt bath to contact the outer surface with salt, vapors of the salt will contact the inside surface of the container if it is not closed. The result will be a weaker bottle, because ion exchange of the pristine surface will weaken that surface. This undesirable ion exchange of the inner surface does not occur in the present process.

The spray used in the examples was obtained by using a De Vilbiss hand gun (Type No. P–EGA–502–390F) made by De Vilbiss Co. and using pressurized air as the carrier gas.

The process of the present invention can provide in addition to the improved strength a coloration to the glass. This coloration is accomplished by incorporating, in the layer of material consisting essentially of salt or salts of alkali metal, as defined above, a salt of a colored heavy metal ion, such as cobalt, that will provide a diffusion of the colored metal in the glass during the elevated temperature treatment for the ion exchange, preferably with the alkali metal salt (carbonate) and at the temperature for ion exchange with etching, mentioned above. Other heavy metals are iron and nickel. Their heavy salts, that are used, do not melt at the elevated temperature used for the ion exchange. Thus their colored salts are, for example, chlorides, carbonates and sulfates of the heavy metals. Such salts constitute less than about 10 percent, and preferably less than about 5 percent, by weight of the alkali metal salt content of the solid layer formed on the glass in the first step of the ion-exchange process.

Dilute nitric acid has been mentioned in various examples as being used for removal of alkali metal carbonate, specifically potassium carbonate, from the glass surface after the ion exchange. It was 3N nitric acid. Other concentrations of aqueous nitric acid have been used. As a matter of fact, potassium carbonate, e.g., can be removed merely by washing with water but such removal takes longer and uses a larger volume of wash liquid. Of course, therefore, the concentration of nitric acid can be varied widely to provide easy removal of salt layer from the surface of the glass.

Modifications of the present invention will be apparent to one of ordinary skill in the art. Thus the foregoing description has been presented for purpose of illustration and not for the purpose of limiting the invention which is limited only by the claims that follow.

We claim:

1. A process for treating an article composed of an inorganic silicate glass containing ions of an alkali metal expressed as oxide, which comprises:
    1. applying to the glass article a mixture of an inorganic salt of a different alkali metal and water, or an organic liquid or mixture thereof, forming on at least an area of a surface of said glass article a substantially continuous layer of material consisting essentially of at least 90 percent by weight of a salt of a different alkali metal, said alkali metal oxide in said glass at least in a surface layer at said area being present in said glass in at least about 5 percent by weight expressed as soda mole equivalent, said alkali metal oxide in said glass being soda and wherein the alkali metal salt of the layer formed on the glass at said area contains potassium carbonate in a molar ratio of potassium carbonate to the total of any other potassium salt present in the layer in at least 1:5;
    2. maintaining said surface area of glass and said layer of material at an elevated temperature at least about 200°C but below the strain point of the glass and at atmospheric pressure and for a period of time between a few seconds and about 24 hours, only for some of said alkali metal of the glass in the surface layer of the glass to exchange with said different alkali metal to provide a compressive stress surface layer in the glass article in said layer but for a time insufficient to provide such ion exchange to a substantial degree in the interior portion of the glass of the article and for a time insufficient to provide substantial stress relaxation of said glass in said surface layer of said area; and
    3. cooling the glass article to a temperature at which said ion exchange does not occur, said layer of material and said alkali metal salt therein being solid at said elevated temperature.

2. A process for treating an article composed of an inorganic silicate glass containing ions of an alkali metal expressed as oxide, which comprises:
    1. applying to the glass article a mixture of an inorganic salt of a different alkali metal and water, or an organic liquid or mixture thereof, wherein said salt of a different alkali metal is alkaline in water, forming on at least an area of a surface of said glass article a substantially continuous layer of material consisting essentially of a salt of a different alkali metal, said alkali metal oxide in said glass at least in a surface layer at said area being present in said glass in at least about 2 percent by weight expressed as soda mole equivalent; wherein the salt of said different alkali metal is a carbonate and wherein the alkali metal salt of the layer contains said carbonate to a total of all other salts of said different alkali metal present in the layer in a molar ratio of at least 1:5, 2. maintaining said surface area of glass and said layer of material at an elevated temperature sufficiently high but below the strain point of the glass and at atmospheric pressure and for a period of time only for some of said alkali metal of the glass in the surface layer of the glass to exchange with said different alkali metal to provide a compressive stress surface layer in the glass article in said layer but for a time insufficient to provide such ion exchange to a substantial degree in the interior portion of the glass of the article and for a time insufficient to provide substantial stress relaxation of said glass in said surface layer of said area; and 3. cooling the glass article to a temperature at which said ion exchange does not occur, said layer of material and said alkali metal salt therein being solid at said elevated temperature, and wherein the glass contains as its ingredients, expressed as oxides, the following in weight percent ranges:

| | |
|---|---|
| $SiO_2$ | 35–88 |
| $M_2O$ | 1–48 |
| $Al_2O_3$ | 0–40 |
| CaO | 0–15 |
| MgO | 0–28 |
| BaO | 0–15 |
| SrO | 0–15 |
| $B_2O_3$ | 0–15 |
| $ZrO_2$ | 0–25 |
| $TiO_2$ | 0–12 |
| $SnO_2$ | 0–2 |
| $P_2O_5$ | 0–10 |
| $As_2O_3$ | 0–3 |
| $Sb_2O_3$ | 0–3 | wherein $M_2O$ refers to the total of alkali metal oxide.

3. A process for treating an article composed of soda-lime-silica glass containing ions of an alkali metal expressed as oxide, which comprises:

1. applying to the glass article a mixture of potassium carbonate and water, or an organic liquid or mixture thereof, forming on at least an area of a surface of said glass article a substantially continuous layer of material consisting essentially of potassium carbonate, said alkali metal oxide in said glass in at least about 2 percent by weight expressed as soda mole equivalent;

2. maintaining said surface area of glass and said layer of material at an elevated temperature sufficiently high but below the strain point of the glass and at atmospheric pressure and for a period of time only for some of said alkali metal of the glass in the surface layer of the glass to exchange with the potassium ions to provide a compressive stress surface layer in the glass article in said layer but for a time insufficient to provide such ion exchange to a substantial degree in the interior portion of the glass of the article and for a time insufficient to provide substantial stress relaxation of said glass in said surface layer of said area; and 3. cooling the glass article to a temperature at which said ion exchange does not occur, said layer of material and said potassium carbonate therein being solid at said elevated temperature.

4. A process for testing an article composed of an inorganic glass containing ions of an alkali metal expressed as oxide, which comprises:

1. applying to the glass article an aqueous solution of potassium carbonate while the aqueous solution is at ambient temperature and the glass is at a temperature of 600°F to 900°F, forming on at least an area of a surface of said glass article a substantially continuous layer of material consisting essentially of potassium carbonate, said alkali metal oxide in said glass at least in a surface layer at said area being present in said glass in at least about 2 percent by weight expressed as soda mole equivalent;

2. maintaining said surface area of glass and said layer of material at an elevated temperature sufficiently high but below the strain point of the glass and at atmospheric pressure and for a period of time only for some of said alkali metal of the glass in the surface layer of the glass to exchange with the potassium ions to provide a compressive stress surface layer in the glass article in said layer but for a time insufficient to provide such ion exchange to a substantial degree in the interior portion of the glass of the article and for a time insufficient to provide substantial stress relaxation of said glass in said surface layer of said area; and 3. cooling the glass article to a temperature at which said ion exchange does not occur, said layer of material and said potassium carbonate therein being solid at said elevated temperature.

5. The process of claim 4 wherein the potassium carbonate aqueous solution is a saturated solution of potassium carbonate.

* * * * *